United States Patent [19]

Gray et al.

[11] Patent Number: 5,441,762

[45] Date of Patent: Aug. 15, 1995

[54] COATING A COMPOSITE ARTICLE BY APPLYING A POROUS PARTICULATE LAYER AND DENSIFYING THE LAYER BY SUBSEQUENTLY APPLYING A CERAMIC LAYER

[75] Inventors: Paul E. Gray, North East, Md.; Mark H. Headinger, Hockessin, Del.

[73] Assignee: E. I. Du Pont de Nemours and Company, Wilmington, Del.

[21] Appl. No.: 27,928

[22] Filed: Mar. 8, 1993

Related U.S. Application Data

[63] Continuation of Ser. No. 893,410, Jun. 2, 1992, abandoned, which is a continuation-in-part of Ser. No. 673,351, Mar. 22, 1991, abandoned.

[51] Int. Cl.⁶ .......................... B05D 3/02; C23C 16/00
[52] U.S. Cl. .................................. 427/190; 427/203; 427/249; 427/255; 427/255.2; 427/387; 427/397.7; 427/419.7
[58] Field of Search ............... 427/190, 203, 249, 255, 427/255.2, 387, 397.7, 419.7

[56] References Cited

U.S. PATENT DOCUMENTS

| | | | |
|---|---|---|---|
| 4,576,836 | 3/1986 | Colmet et al. | 427/255 |
| 4,582,751 | 4/1986 | Vasilos et al. | 428/307.3 |
| 4,599,256 | 7/1986 | Vasilos | 428/114 |
| 4,735,850 | 4/1988 | Eitman | 428/283 |
| 4,749,631 | 6/1988 | Haluska et al. | 482/704 |
| 4,795,677 | 1/1989 | Gray | 428/246 |
| 4,863,773 | 9/1989 | Rousseau et al. | 428/68 |
| 4,863,798 | 9/1989 | Arenz et al. | 428/368 |
| 4,873,353 | 10/1989 | Niebylski | 556/402 |
| 4,892,790 | 1/1990 | Gray | 428/548 |
| 4,894,286 | 1/1990 | Gray | 428/408 |
| 4,942,011 | 7/1990 | Bolt et al. | 264/29.2 |
| 4,960,640 | 10/1990 | Paquette et al. | 428/368 |
| 5,035,921 | 7/1991 | Berneberg et al. | 427/226 |
| 5,094,901 | 3/1992 | Gray | 428/141 |

FOREIGN PATENT DOCUMENTS

| | | | |
|---|---|---|---|
| 0382476 | 8/1990 | European Pat. Off. | C08K 5/55 |
| 0392822 | 10/1990 | European Pat. Off. | C08K 3/93 |
| 2401888 | 3/1979 | France | C04B 35/52 |
| 2589855 | 5/1987 | France | C04B 35/80 |

OTHER PUBLICATIONS

Chemical Abstracts, vol. 112, No. 6, 5 Feb. 1990.

*Primary Examiner*—Benjamin L. Utech

[57] ABSTRACT

Carbon or ceramic matrix composites are protected from oxidation at high temperatures by a layer formed from a mixture of solid particles in a binder which is cured and then coated with ceramic material by chemical vapor infiltration.

4 Claims, No Drawings

COATING A COMPOSITE ARTICLE BY APPLYING A POROUS PARTICULATE LAYER AND DENSIFYING THE LAYER BY SUBSEQUENTLY APPLYING A CERAMIC LAYER

This is a continuation of application Ser. No. 07/893,410 filed Jun. 2, 1992, now abandoned which is a continuation-in-part of U.S. Ser. No. 07/673,351 filed Mar. 22, 1991 now abandoned.

BACKGROUND OF THE INVENTION

This invention relates to improved coatings for composite articles for use in high temperature applications.

Composite articles capable of withstanding exposure to high temperatures have been developed, but there continues to be a need for articles capable of surviving repeated cycles of high temperature and high humidity. It has long been recognized that a major cause of failure of composite articles in high temperature environments is the diffusion of oxygen into the article and the oxidation of the composite matrix, the reinforcing fibers or other elements of the article which are subject to oxidation at high temperatures. There have been many developments aimed at scavenging any oxygen which does penetrate by preferentially oxidizing compounds which form glasses to fill oxygen pathways and prevent further oxygen penetration. Concurrently, composite articles have been coated with inert and impervious layers to prevent the diffusion of oxygen into the composite article. References showing either of both of these techniques include U.S. Pat. No. 4,892,790; U.S. Pat. No. 4,795,677; U.S. Pat. No. 4,894,286; U.S. Pat. No. 4,873,353; and U.S. Pat. No. 4,863,798 as well as commonly assigned application U.S. Ser. No. 07/554,475 now U.S. Pat. No. 5,094,901.

The two primary methods for providing an impervious and inert coating have been application of a polymeric substance which yields a ceramic layer on curing and the direct deposition of a ceramic layer by chemical vapor deposition (CVD). U.S. Pat. No. 4,873,353 is a reference relating to the former method, and U.S. Pat. No. 4,892,790 is a reference relating to the latter. In fact, the '790 patent teaches first an application of ceramic particles in a char-yielding binder and subsequent application of a ceramic layer by CVD. Use of a polymer which converts to a ceramic layer on curing has an advantage of ease of application, but it is not always easy to get a totally impervious coat. Application of a ceramic coat by CVD generally provides a more diffusion resistant layer, but achieving a uniform deposit over the entire surface of an article with complex geometry can be difficult.

Both of the methods described above exhibit some failures when used with composite articles exposed to repeated cycles of high and low temperatures together with exposure to high humidity. It has proven very difficult to completely seal the composite material against invasion of oxygen. Further, since the coatings have different coefficients of thermal expansion than the underlying composite matrix material, microcracks are formed in the outer layer when the article is exposed to repeated cycles of high and low temperature. These microcracks provide additional passages for diffusion of oxygen. Finally, in extremely severe conditions, the articles are exposed not only to temperature extremes, but also to high humidity at low temperatures. Any moisture which diffuses into the layer and condenses at low temperatures is rapidly converted to steam at high temperatures. If the steam is formed faster than it can diffuse out of the article, it can cause the protective layer to spall off the composite article, increasing the avenues for invasion by oxygen.

Thus, there remains a need for a means of protecting composite materials which are to be subjected to repeated exposure both high temperatures and high humidities. Articles which can withstand such conditions are useful in many applications, one example being:in high-performance jet engines. The process of this application provides the required protection for composite articles, and has the advantage of relative processing ease, and excellent dimensional control.

SUMMARY OF THE INVENTION

The process of this invention is well suited to form protective layers on composite materials which have a matrix of either carbon or ceramic material. In the first step the composite article is coated with a mixture of solid particles suspended in a liquid polymeric silicon-containing binder. The particles have diameters of from 0.05 to 50 micrometers, and the binder is present in an amount of from about 1 to about 25% by weight of the particles. This coating is referred to herein as the green coating.

The binder must be curable; that is it must be convertible to a silaceous ceramic material such as silicon carbide on heating. Prior to the final conversion to ceramic material the binder must be crosslinked or thermoset to render it dimensionally stable during subsequent heating for the final conversion. The initial crosslinking or thermosetting is generally accomplished by heating to a moderate temperature, but some polymers crosslink on exposure to ultraviolet light. The term "curing" as used in this application refers to both the initial crosslinking or thermosetting of the binder as well as the subsequent more severe heating to complete the conversion of the binder to ceramic. The second step of the process is to cure the green coating by heating to convert the binder to ceramic material.

The cured coating is then infiltrated and covered by a ceramic layer deposited by chemical vapor infiltration (CVI). In a preferred process, this CVI layer is itself subsequently coated with a solution of a curable preceramic polymer such as a polycarbosilane or polysilazane. This solution will wet and fill any microcracks or pores remaining after the CVI process. The preceramic polymer is then cured to form a ceramic material such as silicon carbide or silicon nitride which improves resistance to infiltration by oxygen. However, this preferred final step is not essential to obtaining a serviceable coating.

Also included within the scope of this invention are composite articles protected by the process of this invention.

DESCRIPTION OF THE PREFERRED EMBODIMENTS

Composite materials suitable as substrates for the process of this invention are carbon-carbon composites, ceramic matrix composites which are reinforced by carbon fibers, or ceramic matrix composites reinforced with ceramic fibers which are protected by a debonding layer which is subject to oxidation. The construction of these composite materials is well known in the art. Such materials frequently have residual porosity which act as paths for entry of oxygen which attacks the reactive elements of the composite at high temperatures. Even composites which have internal oxygen-scavenging components can benefit from a coating which prevents or substantially retards the entry of oxygen. The process of this invention is particularly suited to composites having a matrix of silicon carbide or silicon nitride which are intended for high temperature applications.

The particles useful in this invention may be selected to be compatible with the CVI process and the environment in which the coated composite article will be placed. If the article will not be exposed to very high temperatures, metal particles may be used provided the metal melting point is greater than the anticipated service temperature. For higher temperatures, ceramic materials may be employed. Particles which will form a glass in the presence of oxygen may be used, and the particles selected to form a glass most suited to the conditions of use of the coated composite article. For example, a mixture of calcium boride particles and silicon carbide from the CVI process would yield a glass of low volatility at very high temperatures. Complex multilayer coatings can be built up by applying successive layers of a slurry of different particles. Glass-forming particles would provide an oxygen-scavenging crack-healing under layer with an outer layer of silicon carbide to provide maximum resistance to the invasion of oxygen.

Preferred particles for use in this invention consist of intermetallic alloys containing predominantly boron and silicon with other elemental additions which provide processing ease/stability and may modify the resultant sealant glass composition formed by these particles in an oxidizing environment. Examples of these alloys or compounds include boron carbide, silicon carbide, silicon boride, calcium boride, tantalum boride, niobium boride, hafnium boride, aluminum boride, zirconium boride, rare-earth borides, yttrium boride, germanium boride, germanium silicide, titanium silicide and titanium boride. Metallic silicides and mixed phase boride/silicide combinations are also useful. For certain applications limited to lower use temperatures, elemental boron and silicon may be employed with success.

Selection of the proper particle size is important to the formation of impervious coatings by this process. The particle size must be such that the particle-binder cured coating can be infiltrated when exposed to CVI. If the particles are excessively fine, the particle coating will not be readily infiltrated. If the particles are too coarse, the finished layer can contain too much residual porosity. Thus, particles in the range of 0.05 to 50 micrometers in diameter are useful in this invention, with particles having diameters in the range of 0.1 to 30 micrometers being preferred.

The binder selected must be curable. That is, it must yield a ceramic material on heating. Binders which produce ceramics are, for example, polymers which contain silicon such as polycarbosilane which decomposes to silicon carbide on heating and polysilazane which decomposes to silicon nitride on heating. Other silicon-containing polymers useful as binders include polysilanes, organosilsesquioxane-containing sol-gels, and polyorganosiloxanes. These are described in U.S. Pat. No. 4,942,011 beginning at Column 3, the disclosure of which is incorporated by reference.

Some polycarbosilanes are commercially available. An example is "Nicalon" polycarbosilane X9-6348. It is derived by the action of sodium on dichloromethylsilane and is produced by Nippon Carbon and distributed by Dow Corning.

Preferred binders are polycarbosilanes and polysilazanes.

The ratio of binder to particles is critical. If the percentage of binder is too low, the resultant green coating is too fragile and the particles may fall from the article during subsequent processing. If the amount of binder is too high, the resultant green coating is not easily permeated in the CVI operation. This will result in poor adhesion of the coating to the substrate and the possible formation of shrinkage cracks at high temperatures or instability at high temperatures. Accordingly, the amount of binder should be selected so that the amount of residue remaining after curing is from 1 to 25% by weight of the particles used. Preferably, the amount of binder should be selected so the residue remaining from the binder after curing is from 5 to 15% by weight of the particles.

The binders can be mixed with the solid particles without dilution if their melting points and viscosities are suitable, or the binders can be dissolved in an appropriate solvent. The binder-particle mixture can be applied to the composite article by conventional techniques such as spraying, dipping or brushing. The resulting coating can be easily inspected to assure uniformity and integrity of the binder-particle coating. The green coating is generally applied so that the particle layer has a depth of 0.5 to 25 mils (about 12 to about 625 micrometers).

The green coating is cured by heating. Typically, the resin in the green coating is initially crosslinked by heating in air to a moderate temperature, for example, from 210–230 C. for 30 minutes. The temperature used for the final part of the curing process should be sufficient to convert the binder to ceramic, and will depend on the choice of binder. For a polycarbosilane binder, heating to a temperature of from 800–1200 C. is sufficient to convert the polymer to silicon carbide.

The cured layer is then infiltrated with ceramic material by CVI. CVI is a well known technique described in U.S. Pat. 4,576,836 which is incorporated by reference. In CVI the values of temperature, pressure and flow rate of the reactant gas are selected to be slightly above the minimum values that are required to cause the chemical reaction, so that the kinetics of the process are controlled by the surface reactions (and not by transfers within the vapor phase) to enable the diffusion of the constituents of the reactant gas mixture to the bottom of pores before reacting. In this way any porosity on the surface of the matrix is filled in. The fact that the particles present a porous surface and the binder does not completely coat the underlying ceramic matrix permits the infiltration of ceramic material into any residual porosity of the underlying ceramic. The ceramic material also fills in void spaces between particles on the surface of the article. Finally, as the porous layer becomes fully infiltrated, the CVI process overcoats the entire particle layer. In this way, a ceramic layer is built up which is intimately and firmly bonded to the underlying ceramic matrix in a way that could not be achieved by the more rapid process of chemical vapor deposition. Because the ceramic coating extends from the outer surface into the porosity of the underlying matrix, there is less chance that the coating will be cracked due to differences in the coefficients of thermal expansion of the matrix and the outer coating. Further, since the final thickness of the layer is largely determined by the thickness of the particle layer, this CVI process provides much greater dimensional control than is possible in a CVD process. This means that production of parts to tight dimensional tolerances is possible which reduces the need for subsequent machining. Finally, the CVI process produces a smooth and uniform surface, the coated article having nearly the same final dimensions as the article having only the green coating. This CVI process does not require the complex gas distribution systems in the CVI reactor which would be the case in a CVD process.

These advantages are obtained because the rate of deposition of ceramic material is substantially less in a CVI process than in a CVD process. However, because much of the bulk of the coating layer is applied in the form of a slurry of solid particles, only a small amount of material need be applied through the CVI process to intimately bond these particles to themselves and to the underlying substrate. The ceramic applied by CVI exhibits higher strength and dimensional stability than coatings applied by CVD. Thus the performance of the coatings applied by the process of this invention perform better than coatings applied by conventional methods.

The CVI ceramic coat is applied so that the particle layer is covered generally to a depth of 0.1 to 25 mils (about 12 to about 625 micrometers). The CVI process can deposit a number of different ceramic compositions. It is preferred to employ silicon carbide or silicon nitride as the material laid down by the CVI process. The operation of the CVI process and the choice of gasses to be used in the process are well known to those skilled in the art. It is preferred to shield the articles from direct impingement of the gasses in the CVI reactor.

EXAMPLES

Example 1

A slurry of 10.0 parts by weight "Nicalon" polycarbosilane (PCS) from Nippon Carbon and 100 parts Starck grade HP boron carbide were dispersed in 300 grams of toluene. The slurry was prepared by first dissolving the PCS in the toluene and then adding the boron carbide powder. The slurry was then brushed onto the surface of some 1"×2" C/SiC composites containing an antioxidant additive to a depth of 5–8 mils. Care was taken to ensure the coating was continuous and free from any pinholes or other obvious defects. After the painting of the coupon with the slurry, the PCS in the "green" coating was crosslinked in air to render it stable at the infiltration temperature by heating it to 200–230 C. for 30 minutes. The coupon was cooled and loaded into the CVI reactor. The stabilized PCS binder is pyrolyzed as the reactor is heated to the temperature at which the CVI process is conducted. The coupon was then infiltrated with SiC in the reactor using methyl trichlorosilane and hydrogen at standard deposition conditions. After infiltration, the coupon was coated with a 25% solution of the PCS in toluene until the surface was observed to be smooth and free from pits. The sample was allowed to dry at 25–40 C. for 4 hours to completely remove the solvent. The PCS coated coupon was slowly heated to 210–225 C. over a period of 2 hours and allowed to remain at that temperature for an additional 30 minutes to cross-link the polymer and then placed in a nitrogen purged furnace and heated to 1400 C. over a 2 hour period, and held at that temperature for an additional 15 minutes to assure complete pyrolysis of the polymer. The coupon was lightly brushed to remove excess ceramic remaining on the surface. The coupon was exposed to an oxidation test cycle in which the coupon was placed in an oven at 1400 C. for 5 minutes, moved to an oven at 650 C. for 30 minutes, returned to the 1400 C. oven for an additional 5 minutes and then cooled to room temperature. The weight change of the coupon as a percentage of the total weight after 60, 120, 180 and 250 thermal cycles is shown in the Table below in the column identified as $B_4C$. Another test was performed to assess the effect of humidity and thermal cycling on the coupon coated by this technique. The coupon was subjected to a combinations of 6 thermal cycles described above followed by 20 hours of 100% humidity at 90–100 F. The weight change as a percentage of the total weight was noted after 36 thermal cycles were completed and after 120 hours exposure to the humidity, and then noted again after 72 thermal cycles and after a total of 240 hours humidity exposure. The data are shown in the Table in the column identified as $B_4C$.

Example 2

A sample of C/SiC containing an oxidation-resistant additive was coated in a manner similar to that of Example 1 except that an additional layer of 4–6 mils of particulate SiC with 10% PCS binder was applied over the $B_4C$ layer. This 2-layer coating was then infiltrated with SiC by CVI as described in Example 1. Afterwards, the coupon was coated with an additional layer of the neat polycarbosilane resin, and cured as described in Example 1. The coated coupon was exposed to the same thermal and thermal-humidity cycles described in Example 1. The oxidation performance of this coating on the C/SiC substrate is shown in the Table in the column identified as $B_4C+SiC$.

Example 3

In this example, a 2-layer coating as outlined in example 2 was made substituting calcium boride powder for the boron carbide powder. The same tests outlined above were conducted. The weight change of the sample is shown in the Table in the column identified as $CaB_6+SiC$.

TABLE

| | percent weight change | | |
|---|---|---|---|
| | $B_4C$ | $B_4C+$ $SiC$ | $CaB_6+$ $SiC$ |
| Thermal Cycles | | | |
| 60 | 0.096 | 0.152 | 0.567 |
| 120 | 0.125 | 0.276 | 0.523 |
| 180 | 0.155 | 0.371 | 0.141 |
| 250 | 0.251 | 0.422 | 0.104 |
| Thermal/Humidity Cycles | | | |
| 36 Thermal Cycles | −0.03 | −0.03 | 0.128 |
| 120 Hr. Humidity | 1.7 | 2.12 | 1.54 |
| 72 Thermal Cycles | −0.46 | −0.42 | −0.04 |
| 240 Hr. Humidity | 2.19 | 2.5 | 2.2 |

We claim:
1. A process for applying a coating to a composite article having a ceramic matrix said matrix having surface porosity, the process comprising:
   a. forming a green coating on the composite article by applying to the surface of the matrix of the composite a mixture of particles having diameters in the range of 0.05 to 50 micrometers and a curable liquid polymeric silicon-containing binder, said binder being present in the mixture in an amount of from about 1 to about 25% by weight of said particles;

b. curing the green coating by heating the coating; and c. infiltrating and covering the porous layer with a ceramic layer by chemical vapor infiltration; and wherein said particles are selected from the group consisting of boron carbide, silicon carbide, silicon boride, calcium boride, tantalum boride, niobium boride, hafnium boride, aluminum boride, zirconium boride, rare-earth borides, yttrium boride, germanium boride, germanium silicide, titanium silicide, titanium boride, metallic silicides and mixed phase boride/silicide combinations; and wherein said ceramic matrix of the composite article is selected from the group consisting of silicon carbide and silicon nitride, said curable binder is selected from the group consisting of polycarbosilanes and polysilazanes, and said ceramic layer is selected from the group consisting of silicon carbide and silicon nitride.

2. The process of claim 1 wherein the particles have diameters in the range of 0.1 to 30 micrometers; the depth of the cured coating is from 0.1 to 25 mils; the binder is present in an amount of from about 5 to 15% by weight of the particles; and the ceramic layer has a thickness of from 0.1 to 25 mils over the particles.

3. The process of claim 2 wherein the ceramic layer is coated with a solution of a preceramic polymer selected from the group consisting of polycarbosilanes and polysilazanes, and the solution is cured.

4. The process of claim 1 wherein the ceramic layer is coated with a solution of a preceramic polymer selected from the group consisting of polycarbosilanes and polysilazanes, and the solution is cured.

* * * * *